May 17, 1955  C. D. AINSWORTH  2,708,698
ARC CHUTE WITH BARRIER PLATES HAVING ARC CONSTRICTING MEANS
Filed Dec. 4, 1951.  3 Sheets-Sheet 1

Inventor
Chester D. Ainsworth
by Warren F. B. Lindsley
Attorney

May 17, 1955
C. D. AINSWORTH
2,708,698
ARC CHUTE WITH BARRIER PLATES HAVING ARC CONSTRICTING MEANS
Filed Dec. 4, 1951
3 Sheets-Sheet 2
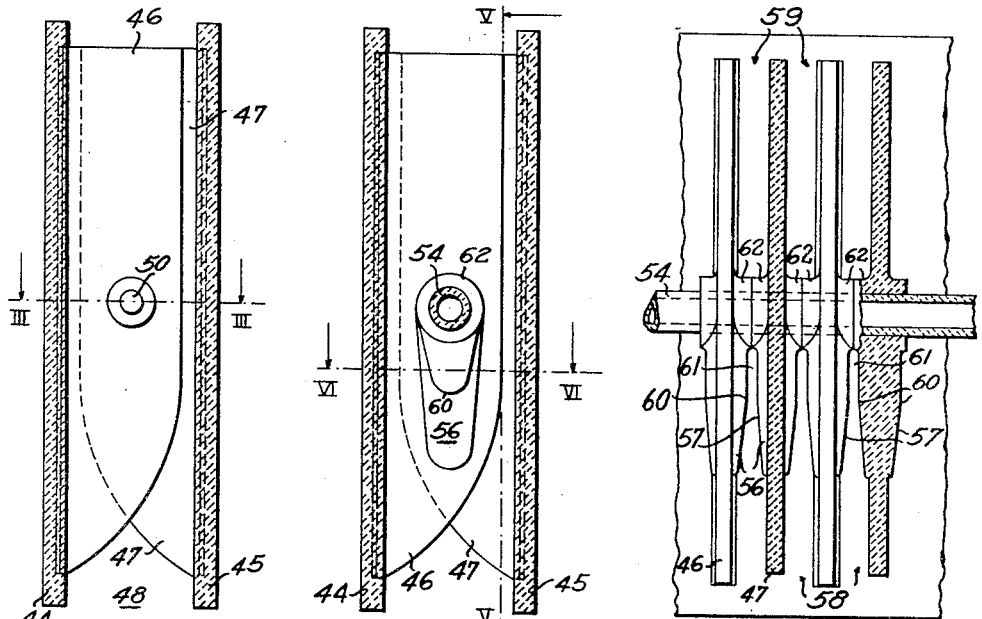
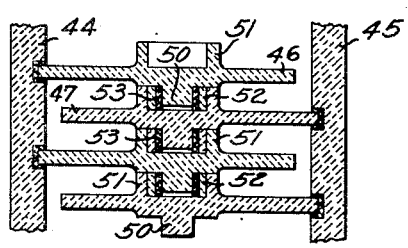
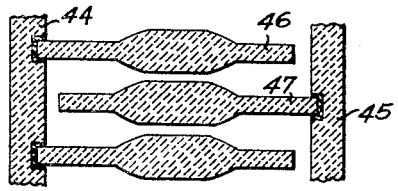
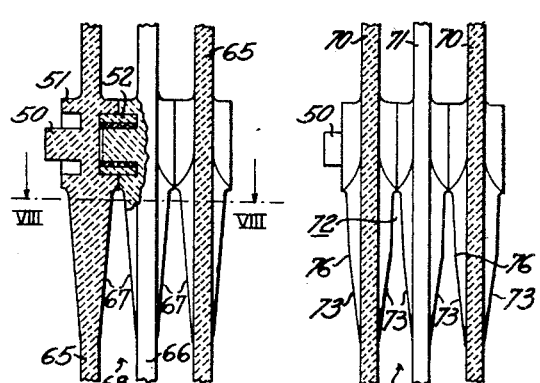
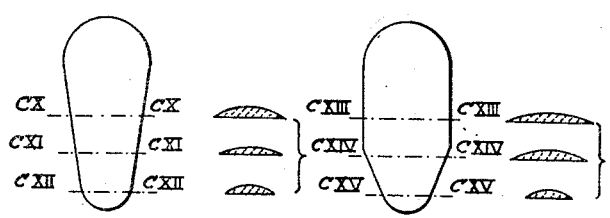
Inventor
Chester D. Ainsworth
by Warren F.B. Lindsley
Attorney

United States Patent Office 2,708,698
Patented May 17, 1955

2,708,698

ARC CHUTE WITH BARRIER PLATES HAVING ARC CONSTRICTING MEANS

Chester D. Ainsworth, Milton, Mass., assignor to Allis-Chalmers Manufacturing Company, Milwaukee, Wis.

Application December 4, 1951, Serial No. 259,860

20 Claims. (Cl. 200—144)

This invention relates to circuit interrupting devices and more particularly to circuit breakers of the air break type wherein an arc established between separable contacts is extinguished within an arc chute.

In the construction and operation of circuit interrupters, it is frequently necessary to provide means for extinguishing quickly the arc which is drawn between separable arcing contacts. This arc is usually blown by blowout means, such as a magnetic blowout coil or an air blast, into an arc chute which is arranged to quench the arc by lengthening it, cooling it, or a combination of both.

The interruption of large current power arcs is often accompanied by an explosive force which strains the arc extinguishing structure. Therefore, the arc chute must be able to withstand the forces created by arc initiation in addition to lengthening and cooling the arc in the shortest possible time.

In accordance with the invention claimed a new and improved circuit interrupting device is provided comprising relatively movable contacts which are actuated to initiate and elongate an arc therebetween. The arc, as it is elongated, is transferred from the region of arc initiation to an arc chute for extinguishment thereof. Barrier plates are arranged transverse to the direction of contact separation within the arc receiving end of the arc chute adjacent the zone of arc initiation to provide with the side walls of the arc chute a passage communicating with a zone or region in the arc chute remote therefrom. The barrier plates of the arc chute are mechanically interconnected by engaging male and female members separated by glass fabric bushings and bonded to each other by means of a suitable cement. Arc constriction is effected in the space between pairs of insulating barrier plates by wedge shaped means arranged on the juxtaposed surfaces of adjacent barrier plates. These wedge shaped means cause the arc sections between adjacent barrier plates to play on and to come into intimate contact with the large surfaces of the barrier plates, thereby rapidly cooling and extinguishing the arc.

It is, therefore, one object of the present invention to provide a new and improved arc interrupting device in which the barrier plates are mechanically interlocked to withstand the strain of the explosive force of the arc.

Another object of the present invention is to provide a new and improved arc interrupting device in which the arc sections between arc chute barrier plates are constricted to aid arc extinguishment.

A further object of the present invention is to provide means for causing arc sections between adjacent barrier plates of an arc chute to play on and to come into intimate contact with the juxtaposed surfaces of the adjacent barrier plates.

A still further object of the present invention is to provide a new and improved way of more evenly distributing the thermal absorption duty of the arc chute over the entire arc chute structure.

Objects and advantages other than those set forth will be apparent from the following description when read in connection with the accompanying drawings, in which:

Fig. 2 is a cross sectional view through the arc chute of Fig. 1 taken along the line II—II;

Fig. 3 is a cross sectional view through the arc chute taken along the line III—III in Fig. 2;

Fig. 4 is a cross sectional view similar to Fig. 2 through a modification of the arc chute structure shown in Fig. 1;

Fig. 5 is a cross sectional view of the arc chute structure shown in Fig. 4 taken along the line V—V;

Fig. 6 is a cross sectional view of the arc chute structure shown in Fig. 4 taken along the line VI—VI;

Fig. 7 is a cross sectional view similar to Fig. 5 of a modification of the barrier structure shown in Fig. 1 illustrating another form of arc constricting means arranged between the barrier plates;

Fig. 8 is a cross sectional view through the arc chute of Fig. 7 taken along the line VIII—VIII;

Fig. 9 is a cross sectional view similar to Fig. 5 of another modification of the barrier structure shown in Fig. 1 illustrating another form of arc constricting means arranged between the barrier plates;

Figs. 14 and 15 illustrate diagrammatically two forms of arc constricting means which may be applied to barrier plates to constrict the arc;

Fig. 24 illustrates a plurality of cross sections of the arc constricting means of Fig. 14 taken along the lines CX, CXI and CXII; and Fig. 25 illustartes a plurality of cross sections of the arc constricting means of Fig. 15 taken along the lines CXIII, CXIV and CXV.

Figure 1:
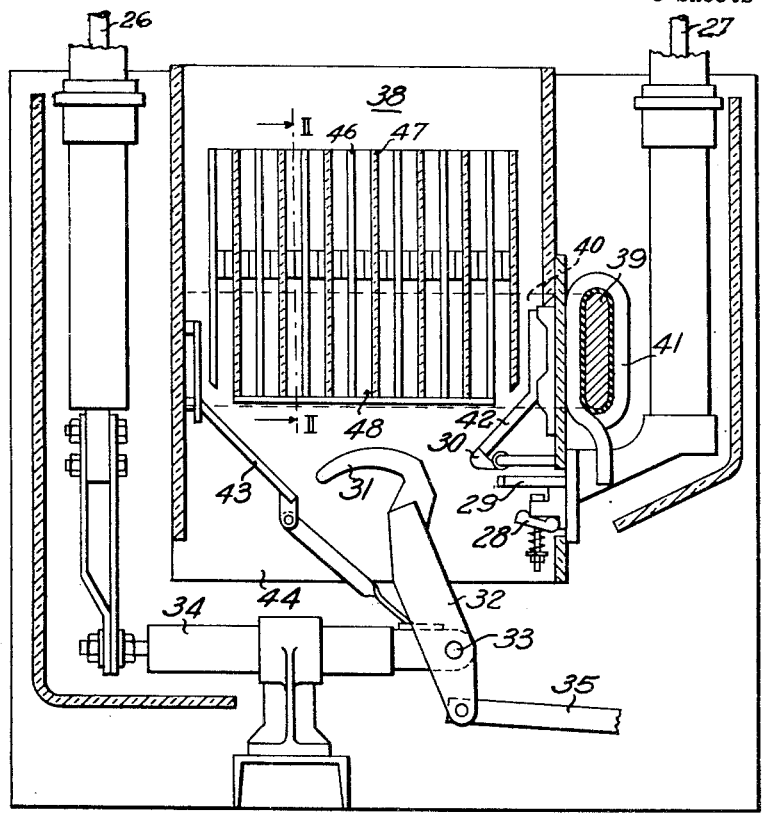
Fig. 1 is a view in vertical cross section of a magnetic blowout type circuit breaker employing the present invention.

Referring more particularly to the drawings by characters of reference, Fig. 1 illustrates a magnetic blowout type of circuit breaker including as elements thereof a pair of terminal studs 26 and 27 for connecting the circuit breaker to line conductors (not shown). Although in general, circuit breakers of the type considered in Fig. 1 are provided with a plurality of similar pole structures, one for each phase of a polyphase electric circuit, only one such pole structure is shown in the drawing and the circuit breaker will be described in detail as if it was of the single pole unit type.

The circuit interrupter or breaker in Fig. 1 comprises essentially means for opening the circuit to form the interrupting arc and an arc extinguishing structure. Specifically, the circuit opening means comprises fixed current carrying contact 28 and tertiary contact 29, a fixed arcing contact 30, and a movable arcing contact 31.

Arcing contact 31 is mounted on a lever 32 which is pivotally mounted at 33 on an extension 34 of the circuit breaker stud 26 and is operated by means of a reciprocally movable rod 35. The operating rod 35 is suitably connected to an actuating mechanism (not shown) for operating the movable contact between closed and open circuit positions. Fig. 1 illustrates the movable contact 31 in an intermediate position. The arcing contacts are electrically connected to the lower ends of terminal studs 26 and 27. Accordingly, when the breaker is connected in series in a power circuit and the arcing contacts are separated, an arc may form across the gap indicated.

For interrupting this power arc, an arc extinguishing structure, such as an arc chute 38 may be mounted so as to receive the power arc which is under the influence of a magnetic blowout means. The arc chute preferably is disposed directly above the arcing contacts, as shown, when the blowout means act upward, but may be mounted in any other suitable location when the blowout means act in other directions. The switch or arcing contacts and the magnetic blowout structure can assume any preferred form so that a brief description thereof will be sufficient. The magnetic blowout means may comprise a core 39, poles 40, and a coil 41 which is electrically connected to the terminal stud 27 and to a metallic arc runner 42 so that the arc current (as the arc travels along the runner) flows through the blowout coil in a manner well known in the art.

Normally the current is carried in the closed circuit position of the breaker by contact 31 and the spring biased contact 28. While the movable arcing contact 31 is actuated to open circuit position, current is shunted from fixed contact 28 first to fixed contact 29 and then to fixed arcing contact 30. As the arc is drawn by the movable arcing contact 31, the arc terminal on arcing contact 30 is transferred to arc runner 42, which is usually an extension arm of the fixed arcing contact 30. As the movable arcing contact 31 approaches or reaches its full opening stroke the arc terminal transfers from the movable arcing contacts 31 to an arc runner 43 which directs the arc into the arc chute 38. One end of the blowout coil 41 is connected to the arcing contact 30 and the other end to tertiary contact 29. When the movable arcing contact 31 parts from contact 29, the flow of current is transferred from contact 29 to contact 30 through the blowout coil 41. The movable arcing contact 31 subsequently parts from contact 30 to draw an arc. Accordingly, the blowout coil is already energized at the inception of the arc interruption to influence the arc in a well known manner, i. e. to drive it into the arc chute 38 in an expanding loop. It will be apparent to one skilled in the art that the blowout field can be utilized in the most efficient manner by disposing the iron poles 40 so as to cooperate with the blowout coil in the conventional manner outside of the arc chute.

In accordance with the invention claimed, arc chute 38 illustrated in Figs. 1 to 3 comprising spaced insulating side walls 44 and 45 is provided with a plurality of spaced insulating interleaved and overlapping tapered fins or barrier plates 46 and 47. Fins or barrier plates 46 extend from the side of side wall 44 facing side wall 45, and fins or barrier plates 47 extend from the side of side wall 45 facing side wall 44. Barrier plates 46 and 47 are arranged in spaced relation longitudinally of arc chute 38 in a direction generally transverse of the direction of movement of the arc. That is, the barrier plates 46 and 47 are so arranged that the planes of their surfaces extend longitudinally of the axis of the arc chute 38. The barrier plates 46 and 47 are tapered in height along the edges thereof extending away from side walls 44 and 45 toward the arc receiving end 48 of arc chute 38.

Pairs of contiguous fins or barrier plates 46 and 47 are mechanically interconnected to increase the mechanical strength of the chute as a structural unit. The increase of mechanical strength is paralleled by a relatively great flexibility of the structure due to the mode in which the contiguous fins or barrier plates are mechanically interconnected or tied together. The mechanical interconnection is effected by engaging a male or stud member 50 secured to one of a pair of contiguous plates and a cooperating female or flange member 51 secured to the other of the pair of contiguous plates. The male and female members are separated by glass fabric bushings 52 and are bonded to each other by means of a suitable cement 53. Members 50 and 51 are usually arranged on the barrier plate so their longitudinal axis is perpendicular to the barrier plate axes or perpendicular to the axis of the arc chute when placed in the arc chute structure.

In accordance with one feature of the invention adjacent or juxtaposed faces of contiguous barrier plates which are mechanically interconnected or tied together by a pair of male and female members are provided with projections defining between them a wedge shaped space. This space tends to constrict the arc as it is propelled by the action of the magnetic blowout field toward its converging end. These projections may also be in the form of wedges having a flat face which is secured to one of the juxtaposed barrier plate surfaces and a sloping surface which diverges toward the exhaust end of the arc chute. Such constriction of the arc tends to increase the rate of rise of the arc voltage and to reduce the arcing time and consequently the arc energy. These arc constricting wedges may be an integral part of each of the adjacent plates, and the tie means and the arc constricting means of each of the adjacent barrier plates may be combined with the plates to form monolithic structures.

Figs. 4, 5 and 6 illustrate a modification of the barrier plate structure shown in Figs. 1, 2 and 3. These figures show how the barrier plates 46 and 47 may be mechanically interlocked by mounting them on a common metallic or insulating tube 54. The tube 54 is protected from the arc by flanges 62 arranged on each of the juxtaposed surfaces of the adjacent barrier plates 46 and 47. An arc constricting means comprising wedge shaped member 56 which is arranged between adjacent barrier plates 46 and 47 tapers along surfaces 57 from the arc receiving end 58 of the barrier plate structure toward the arc extinguishing end 59 of the barrier plate structure. At a point 60 on surfaces 57 the members 56 provide a constricted arc passage 61 which retains the arc at its constricted size and causes the arc to play on and to come into intimate contact with the surfaces of the flanges 62 which are arranged on juxtaposed barrier plate surfaces for receiving the tube 54.

Under normal interrupting conditions an arc is initiated immediately upon separation of the arcing contacts 30 and 31. The terminal of the arc on fixed arcing contact 30 is driven over arc runner 42 by the magnetic blowout means and the thermal effect of the arc. As movable arcing contact 31 nears its fully open position the other terminal of the arc is moved from contact 31 to arc runner 43 and is also driven by the blowout means and the thermal effect of the arc toward the exhaust end of arc chute 38.

As the arc terminals move along the arc runners 42 and 43 toward the exhaust end of arc chute 38, the arc is driven into a narrow zigzag passage formed between the spaced overlapping fins or barrier plates 46 and 47.

The arc rises in this zigzag passage under the influence of the blowout means and the thermal effect of the arc until it is extinguished. In passing through the barrier plates the arc is folded both in planes substantially normal and in planes substantially parallel to the direction of arc propagation. The latter folding is partly due to the fact that the arc is looped around the flange provided on each of a pair of the plurality of pairs of mechanically interconnected fins or barrier plates. Arc elongation in two planes rather than one plane results in a higher arc voltage per unit of chute length and consequently in a decrease of arcing time and arc energy.

The wedge shaped arc constricting means 56 increases the voltage gradient of the arc by a combination of elongation of the arc in planes substantially normal to and parallel with the direction of arc propagation and by constriction of the arc in the narrow interbarrier wedge space. Further, the wedge shaped arc constricting means 56 and the flanges on the barrier plates for receiving the rods or barrier interconnecting means exposes, by deflecting the arc sections between the barrier plates normal to the direction of arc propagation, the arc laterally to the large juxtaposed surfaces of adjacent barrier plates.

Effecting arc constriction in the space between pairs of insulating plates which are arranged edgewise transversely to the direction of contact separation and causing the arc sections of relatively wide diameter adjacent to the constricted arc section to play on, and to come into intimate contact with, the large surfaces of the barrier plates involve arc cooling and arc constricting principles heretofore unknown. In prior art devices the narrow edges of inverted V-shaped slots in barrier plates of the arc chute structures were subject to a heavy thermal burden tending to result in rapid deterioration of the barrier plates at their edge zones. This invention eliminates this drawback by exposing the juxtaposed surfaces of the barrier plates to the arc in such a manner that those surfaces assume the constricting, cooling and deionizing duty of the circuit breaker structure.

Figs. 7 and 8 illustrate a barrier plate assembly comprising pairs of barrier plates 65, 66 interconnected by a stud and flange arrangement as shown in Figs. 1 to 3, inclusive. The arc constricting means arranged between the barrier plates comprises surfaces 67 which converge from the arc receiving end 68 of the assembly toward the stud and flange interconnecting means.

Fig. 9 illustrates a barrier plate assembly comprising a pair of barrier plates 70, 71 interconnected by the flange and stud arrangement of Figs. 1 to 3, inclusive, and having arranged between the plates 70, 71 an arc constricting means 72 which has surfaces 73 converging from the arc receiving end 74 of the barrier plate assembly toward the stud and flange interconnecting means. At a point 76 on surfaces 73 the slope of the surfaces 73 changes and the arc is constricted at a slower rate as it passes through the remainder of the arc chute toward the stud and flange interconnecting means.

Figs. 14, 15, 24 and 25, illustrate diagrammatically the manner in which the arc constricting surfaces of Figs. 7 and 9 differ.

Figure 10:
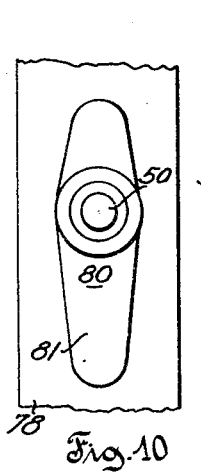
Figs. 10 and 12 are end views of modifications of the barrier plates structure shown in Fig. 1.
Figure 11:
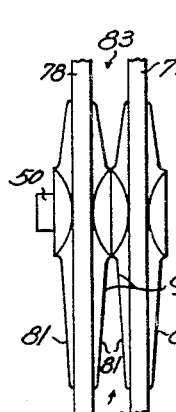
Figs. 11 and 13 are side views of the barriers illustrated in Figs. 10 and 12, respectively.

Figs. 10 and 11 illustrate a barrier plate assembly similar to that of Fig. 9 except that barrier plates 78 and 79 are provided with an arc constricting means 80 which extends beyond the stud and flange barrier plate interconnecting means. Surfaces 81 of the arc constricting and cooling means 80 converge from the arc receiving end 82 of the barrier plate assembly to the stud and flange interconnecting means and diverge from the stud and flange interconnecting means to the exhaust end 83 of the barrier plate assembly.

Figure 12:
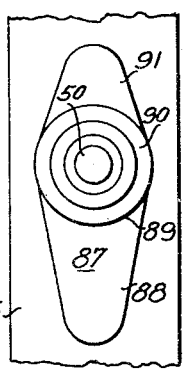
Figure 13:
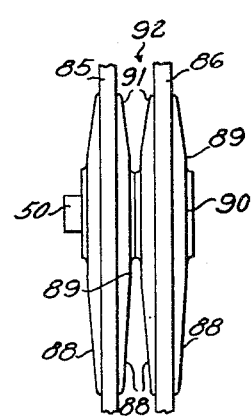
Figure 16:
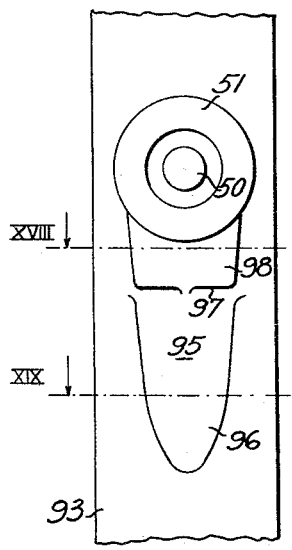
Figs. 16 and 20 are end views of modifications of the barrier plates illustrated in Fig. 1.
Figure 17:
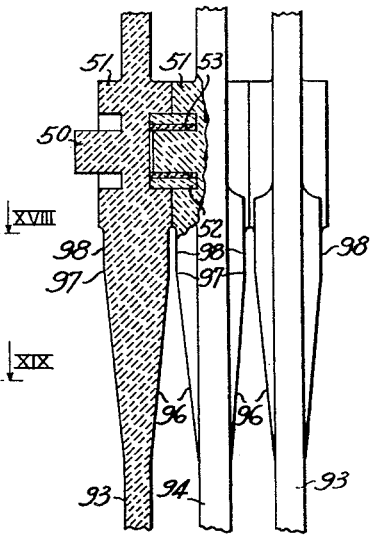
Figs. 17 and 21 are side views partly in cross section of the barrier plates illustrated in Figs. 16 and 20, respectively.
Figure 18:
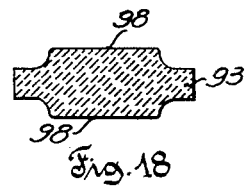
Fig. 18 is a cross sectional view through the arc chute structure shown in Fig. 16 taken along the line XVIII—XVIII.
Figure 19:
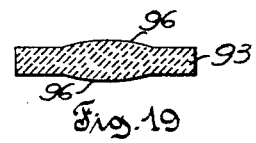
Fig. 19 is a cross sectional view through the arc chute structure shown in Fig. 16 taken along the line XIX—XIX.
Figure 20:
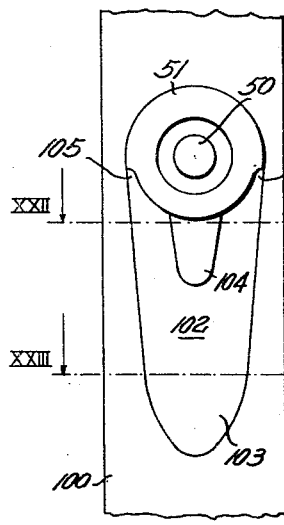
Figure 21:
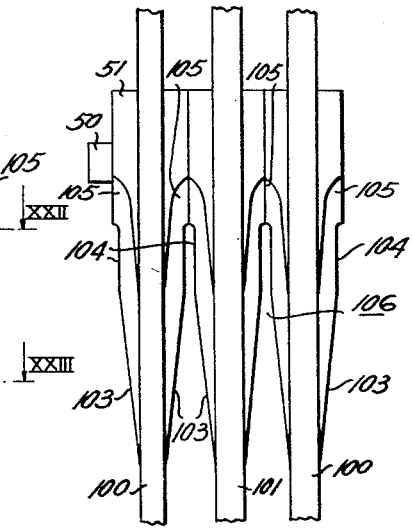
Figure 22:
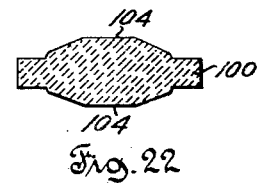
Fig. 22 is a cross sectional view through the arc chute structure shown in Fig. 20 taken along the line XXII—XXII.
Figure 23:
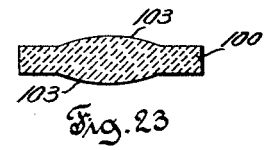
Fig. 23 is a cross sectional view through the arc chute structure shown in Fig. 20 taken along the line XXIII—XXIII.

Figs. 12 and 13 illustrate a barrier plate assembly similar to that of Figs. 10 and 11 except that barrier plates 85 and 86 are provided with an arc constricting means 87 which provides surfaces 88 converging to an arcuate line 89 and then substantially parallel surfaces 90 which extend from the arcuate line 89 to the stud and flange assembly (as shown in Fig. 12) and diverging surfaces 91 which extend from the arcuate line 89 toward the exhaust end 92 of the barrier plate assembly.

Figs. 16 to 19, inclusive, illustrate a barrier plate assembly in which a pair of barrier plates 93 and 94 are interconnected by the stud and flange assembly illustrated in Figs. 1 to 3, inclusive. These barrier plates are provided with an arc constricting means 95 which is narrower than the outside diameter of the hub or flange 51. In this modification the surfaces 96 of the arc constricting means 95 are sloping up to the line 97. From line 97 to flange 51 the surfaces 98 of the arc constricting means are substantially parallel.

Figs. 20 to 23, inclusive, illustrate a barrier plate assembly in which the barrier plates 100 and 101 are provided with an arc constricting means 102. Arc constricting means 102 is provided with tongue shaped converging surfaces 103 and substantially parallel surfaces 104. Surfaces 103 and 104 are so arranged that they provide with flange 51 wedge shaped traps 105 for collecting the products of arcing. As the crest of the arc loop is arrested at the apex of an arc constricting groove 106, the arcing products formed at the lower level sections of the arc on both sides of the flange 51 immediately adjacent the arrested loop crest rise into the two lateral wedge shaped traps or pockets 105 where they are deionized by surface action. This prevents these arc products from rising above the point at which the barrier plates 100 and 101 are joined together by the flange 51 and stud 50, to lower the dielectric properties of the arc chute. Unrestrained issuing of the arc products above the point at which the plates are joined together is conducive to formation of an arc in parallel to the arc in the arc constricting groove 106. Such an arc in parallel would be subjected to a less intense cooling action than the arc within the arc constricting groove and hence draw all the current, ultimately replacing the arc within the groove and causing failure of the circuit breaker.

Although a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. An electric circuit interrupter comprising means for drawing an arc and an arc chute for extinguishing the arc, said chute comprising a plurality of spaced insulating barrier plates arranged so that the planes of their surfaces extend longitudinally of the axis of said chute, and barrier plate interlocking means comprising a stud arranged on one of a pair of barrier plates perpendicular to the axis of said chute and a cooperating flange arranged on the other of said pair of barrier plates for receiving said stud.

2. An electric circuit interrupter comprising means for drawing an arc and an arc chute for extinguishing the arc, said chute comprising a plurality of pairs of spaced insulating barrier plates arranged so that the planes of their surfaces extend longitudinally of the axis of said chute, and means for mechanically interconnecting adjacent barrier plates to increase the mechanical strength of said chute, said means comprising a male member secured to one of said pair of contiguous plates and a cooperating female member secured to other of said pair of contiguous plates for receiving said male member and a bonding agent for holding said members together.

3. An electric circuit interrupter comprising means for drawing an arc and an arc chute for extinguishing the arc, said chute comprising a pair of side walls, a plurality of insulating plates spaced from one another laterally of the longitudinal axis of said chute and extending into said chute from opposite side walls thereof, means extending from one barrier plate into an adjacent barrier plate of said chute for mechanically interconnecting said barrier plates into a single structure, wedge shaped means mounted on the juxtaposed surfaces of adjacent plates and converging from the arc receiving end toward the exhaust end of said chute for restricting and cooling the arc sections therebetween, and means for biasing the arc established near one end of said plates into said chute whereby the arc is folded in planes substantially normal and in planes substantially parallel to the general direction of arc propagation.

4. An electric circuit interrupter comprising means for drawing an arc and an arc chute for receiving the arc at one end and exhausting the arcing products at the other end, said chute comprising a plurality of spaced insulating barrier plates providing arc cooling surfaces arranged so that the planes of their surfaces extend longitudinally of the axis of said chute, and means comprising arc constricting surfaces arranged in the space between adjacent barrier plates transversely to the direction of contact separation, secured to juxtaposed surfaces of said adjacent barrier plates and converging from the arc receiving end to the exhaust end of said chute for cooling and extinguishing the arc sections existing between said adjacent barrier plates.

5. An electric circuit interrupter comprising means for drawing an arc and an arc chute for receiving the arc at one end thereof and exhausting the arcing products at the other end thereof, said chute comprising a plurality of spaced insulating barrier plates arranged so that the planes of their surfaces extend longitudinally of the axis of said chute, means extending from one plate into an adjacent barrier plate transversely of the axis of said chute for mechanically interconnecting said barrier plates, and arc constricting means arranged in the space between adjacent barrier plates transversely to the direction of contact separation for deflecting the arc sections between adjacent barrier plates normal to the direction of arc propagation, said arc constricting means comprising surfaces which converge from the arc receiving end of said chute toward the exhaust end of said chute.

6. An electric circuit interrupter comprising means for drawing an arc and an arc chute for receiving the arc at one end thereof and exhausting the arcing products at the other end thereof, said chute comprising a plurality of spaced insulating barrier plates arranged so that the planes of their surfaces extend longitudinally of the axis of said chute, means extending from one plate into an adjacent barrier plate transversely of the axis of said chute for mechanically interconnecting said barrier plates, and arc constricting means arranged in the space between adjacent barrier plates for deflecting the arc laterally to the juxtaposed surfaces of said barrier plates, said means comprising a first pair of surfaces having a predetermined slope which converges from the arc receiving end of said chute toward said interconnecting means, and a second pair of converging surfaces having a predetermined slope which intersect said first pair of converging surfaces and extend to said interconnecting means.

7. An electric circuit interrupter comprising means for drawing an arc and an arc chute for receiving the arc at one end thereof and exhausting the arcing products a the other end thereof, said chute comprising a plurality of spaced insulating barrier plates arranged so that the planes of their surfaces extend longitudinally of the axis of said chute, means extending from one plate into an adjacent barrier plate transversely of the axis of said chute for mechanically interconnecting said barrier plates, and arc constricting means arranged in the space between adjacent barrier plates for deflecting the arc laterally to the juxtaposed surfaces of said barrier plates, said means comprising a first pair of surfaces having a predetermined slope which converge from the arc receiving end of said chute toward said interconnecting means and a second pair of surfaces intersecting said first pair of surfaces and arranged substantially parallel with said longitudinal axis of said chute and extending to said interconnecting means.

8. An electric circuit interrupter comprising means for drawing an arc and an arc chute for receiving the arc at one end thereof and exhausting the arcing products at the other end thereof, said chute comprising a plurality of spaced insulating barrier plates arranged so that the planes of their surfaces extend longitudinally of the axis of said chute, means for mechanically interconnecting adjacent barrier plates to increase the mechanical strength of said chute, said means comprising a stud arranged on one of a pair of barrier plates and a cooperating flange arranged on the other of said pair of barrier plates, and an arc constricting means arranged longitudinally of the axis of said chute between adjacent barrier plates for rapidly cooling and extinguishing the arc, said arc constricting means comprising tongue shaped members each arranged with a flat side against a barrier plate surface, a curved surface facing toward the juxtaposed surface of an adjacent barrier plate, and a flat surface formed on said curved surface arranged substantially parallel with the longitudinal axis of said chute and extending to said interconnecting means, said curved surface converging toward said interconnecting means.

9. An electric circuit interrupter comprising means for drawing an arc and an arc chute for receiving the arc at one end thereof and exhausting the arcing products at the other end thereof, said chute comprising a plurality of spaced insulating barrier plates arranged so that the planes of their surfaces extend longitudinally of the axis of said chute, means for mechanically interconnecting adjacent barrier plates to increase the mechanical strength of said chute, said means comprising a stud arranged on one of a pair of barrier plates and a cooperating flange arranged on the other of said pair of barrier plates, and an arc constricting means arranged longitudinally of the axis of said chute between adjacent barrier plates for rapidly cooling and extinguishing the arc, said arc constricting means comprising tongue shaped members each arranged with a flat side against a barrier plate surface, a curved surface facing toward the juxtaposed surface of an adjacent barrier plate, and a flat surface formed on said curved surface arranged substantially parallel with the longitudinal axis of said chute and extending to said interconnecting means, said curved surface converging toward said interconnecting means, and trap means arranged at the intersection of said curved surface and said flat surface with said flange for trapping the products of arcing.

10. An elecric circuit interrupter comprising means for drawing an arc and an arc chute for receiving and extinguishing the arc, said chute comprising a pair of spaced side walls and a plurality of spaced interleaving barrier plates of insulating material projecting alternatingly from said side walls in a direction generally transversely of the arc as initially drawn, said plates having cooperating tie means forming integral parts thereof and extending generally in a direction longitudinally of said arc for mechanically interconnecting adjacent of said plates to form a structure of increased mechanical strength, said tie means being arranged in spaced relation to said side walls to restrain movement of the arc at the point where said tie means are located.

11. An electric circuit interrupter comprising means for drawing an arc and an arc chute for receiving and extinguishing the arc, said chute comprising a pair of spaced side walls and a plurality of spaced interleaving barrier plates of insulating material projecting alternatingly from said side walls in a direction generally transversely of the arc as initialiy drawn, said plates having cooperating tie means forming integral parts thereof and extending generally in a direction longitudinally of said arc for mechanically interconnecting adjacent of said plates to form a structure of increased mechanical strength, said tie means being arranged in spaced relation to said side walls to restrain movement of the arc at the point where said tie means are located, means arranged on the juxtaposed surfaces of adjacent plates to constrict sections of the arc between said adjacent plates as the arc moves from the arc receiving end toward the exhaust end of the arc chute.

12. In an electric circuit breaker comprising means for drawing an arc, a pair of spaced plates of insulating material arranged transversely of the path along which the arc is originally drawn to provide a tortuous arc path, means for tying together said plates comprising cooperating male and female elements each forming an integral part of one of said plates and arc constricting means extending between the zone of arc initiation and said tie means forming an integral part of each of said plates, said tie means and said constricting means combining with each of said plates to form a pair of monolithic structures.

13. In an electric circuit breaker comprising means for drawing an arc, a pair of spaced plates of insulating material arranged transversely of the path along which the arc is originally drawn to provide a tortuous arc path, means for tying together said plates comprising cooperating male and female elements each forming an integral part of one of said plates and arc constricting means comprising wedge shaped elements formed integral with each of said plates and converging from the zone of arc initiation to said tie means, said tie means and said constricting means combined with each of said plates to form a pair of monolithic structures.

14. An electric circuit interrupter comprising contact means for drawing an arc and an arc chute for extinguishing the arc, said chute comprising a plurality of spaced insulating barrier plates providing arc cooling surfaces arranged so that the planes of their surfaces extend substantially transversely to the direction of contact means separation, and an arc constricting means forming an integral part of the juxtaposed surfaces of said adjacent barrier plates and extending from the arc receiving end of said chute toward the exhaust end of said chute for causing the arc sections between adjacent barrier plates to play on and come into intimate contact with the cooling surfaces of said barrier plates.

15. An electric circuit interrupter comprising means for drawing an arc and an arc chute for extinguishing the arc, said chute comprising a plurality of spaced insulating barrier plates arranged so that the planes of their surfaces extend longitudinally of the axis of said chute, said plates providing cooperating and engaging surfaces secured to juxtaposed surfaces of adjacent plates which extend from the arc receiving end of said chute toward the exhaust end of said chute for restricting, cooling and extinguishing the arc sections between adjacent plates to aid arc extinction.

16. An electric circuit interrupter comprising means for drawing an arc and an arc chute for receiving the arc at one end thereof and exhausting the arcing products at the other end thereof, said chute comprising a plurality of spaced insulating barrier plates arranged so that the planes of their surfaces extend longitudinally of the axis of said chute, means extending from one plate into an adjacent plate transversely of the axis of said chute for mechanically interconnecting said plates, and an arc constricting means forming a part of adjacent juxtaposed surfaces of said plates and extending from the arc receiving end of said chute toward the exhaust end of said chute for deflecting the arc sections between adjacent plates normal to the direction of arc propagation.

17. An electric circuit interrupter comprising means for drawing an arc and an arc chute for extinguishing the arc, said chute comprising a pair of side walls, a plurality of overlapping insulating plates spaced from one another laterally of a longitudinal axis of said chute and alternately extending into said chute from opposite said side walls thereof to provide a narrow zigzag arc passage between the spaced overlapping barrier plates, means extending from each of said barrier plates to the adjacent said barrier plates of said chute across the said zigzag arc passage for interconnecting said barrier plates into a single structure, and means biasing the arc established near one end of said plates into said chute for driving the arc against said interconnecting means to fold the arc in a plane substantially normal to the general direction of arc propagation.

18. An electric circuit interrupter comprising means for drawing an arc and an arc chute for extinguishing the arc, said chute comprising a pair of side walls, a plurality of overlapping insulating plates spaced from one another laterally of a longitudinal axis of said chute and alternately extending into said chute from opposite said side walls thereof to provide a narrow zigzag arc passage between the spaced overlapping barrier plates, means extending from one barrier plate into an adjacent said barrier plate of said chute across the said zigzag arc passage, and means biasing the arc established near one end of said plates into said chute for driving the arc against said interconnecting means to fold the arc in a plane substantially normal to the general direction of arc propagation.

19. An electric circuit interrupter comprising a means for drawing an arc and an arc chute for receiving the arc at one end and exhausting the arcing products at the other end, said chute comprising a plurality of spaced insulating barrier plates providing arc cooling surfaces arranged so that the planes of their surfaces extend longitudinally of the axis of said chute, and means comprising arc constricting surfaces arranged in the space between adjacent barrier plates transversely to the direction of contact separation and secured to juxtaposed surfaces of said adjacent barrier plates for cooling and extinguishing the arc sections existing between adjacent barrier plates.

20. An electric circuit interrupter comprising means for drawing an arc and an arc chute for receiving the arc at one end thereof and exhausting the arcing products at the other end thereof, said chute comprising a plurality of spaced insulating barrier plates arranged so that the lines of their surfaces extend longitudinally of the axis of said chute, an arc constricting means arranged in the space between adjacent barrier plates transversely to the direction of contact separation for deflecting the arc sections between adjacent barrier plates normal to the direction of arc propagation.

References Cited in the file of this patent

UNITED STATES PATENTS

| | | |
|---|---|---|
| 1,896,763 | Austin | Feb. 7, 1933 |
| 1,896,779 | Lingal | Feb. 7, 1933 |
| 2,442,199 | Dickinson et al. | May 25, 1948 |
| 2,477,189 | Lerstrup | July 26, 1949 |
| 2,575,730 | Sandin et al. | Nov. 20, 1951 |